(12) United States Patent
Rhie

(10) Patent No.: US 9,491,211 B2
(45) Date of Patent: Nov. 8, 2016

(54) SYSTEM AND METHOD FOR CONTENT PROVIDING SERVICE AND DEVICE APPLIED TO SAME

(71) Applicant: SK PLANET CO., LTD., Gyeonggi-Do (KR)

(72) Inventor: Sang Woo Rhie, Seoul (KR)

(73) Assignee: SK BROADBAND CO., LTD. (KR)

( * ) Notice: Subject to any disclaimer, the term of this patent is extended or adjusted under 35 U.S.C. 154(b) by 0 days.

(21) Appl. No.: 14/407,615

(22) PCT Filed: Jul. 31, 2013

(86) PCT No.: PCT/KR2013/006911
§ 371 (c)(1),
(2) Date: Dec. 12, 2014

(87) PCT Pub. No.: WO2014/038792
PCT Pub. Date: Mar. 13, 2014

(65) Prior Publication Data
US 2015/0172341 A1 Jun. 18, 2015

(30) Foreign Application Priority Data

Sep. 5, 2012 (KR) .................. 10-2012-0098219
Sep. 7, 2012 (KR) .................. 10-2012-0099279
Sep. 7, 2012 (KR) .................. 10-2012-0099280

(51) Int. Cl.
| | |
|---|---|
| *H04L 29/06* | (2006.01) |
| *H04L 29/08* | (2006.01) |
| *H04W 72/04* | (2009.01) |
| *H04W 72/10* | (2009.01) |
| *H04L 12/927* | (2013.01) |
| *H04N 21/2385* | (2011.01) |
| *H04N 21/239* | (2011.01) |
| *H04N 21/262* | (2011.01) |

(52) U.S. Cl.
CPC ......... *H04L 65/4084* (2013.01); *H04L 47/801* (2013.01); *H04L 47/805* (2013.01); *H04L 65/80* (2013.01); *H04L 67/325* (2013.01); *H04N 21/2385* (2013.01); *H04N 21/2393* (2013.01); *H04N 21/26216* (2013.01); *H04W 72/044* (2013.01); *H04W 72/0446* (2013.01); *H04W 72/10* (2013.01)

(58) Field of Classification Search
CPC .......... H04L 65/4084; H04L 67/325; H04W 72/044; H04W 72/0446
See application file for complete search history.

(56) References Cited

FOREIGN PATENT DOCUMENTS

| | | |
|---|---|---|
| EP | 1 317 103 A2 | 4/2003 |
| EP | 2 202 924 A1 | 6/2010 |
| WO | 2011/157833 A1 | 12/2011 |

OTHER PUBLICATIONS

Extended European Search Report in European Patent Application No. 13836033.4, dated Mar. 14, 2016.

*Primary Examiner* — Erin File
(74) *Attorney, Agent, or Firm* — Bakerhostetler LLP

(57) ABSTRACT

A content providing service system includes a plurality of UEs configured to request and receive real time contents required to be received in real time or reserved contents reserved in advance from a service device and the service device configured to, when the real time contents or the reserved contents are requested from each of the plurality of UEs at a particular time, first allocate transmission resources to the UEs which request the real time contents and allocate the remaining transmission resources except for the first allocated transmission resources to at least some of the UEs which request the reserved contents.

16 Claims, 10 Drawing Sheets

SYSTEM AND METHOD FOR CONTENT PROVIDING SERVICE AND DEVICE APPLIED TO SAME

BACKGROUND OF THE INVENTION

1. Field of the Invention

The present disclosure relates to a content providing service system, a method thereof, and a device applied to the same, and more particularly to a content providing service system, a method thereof, and a device applied to the same which can provide contents in response to a real time content request and a reserved content request and provide a service for a preferred interval of particular contents.

2. Description of the Prior Art

According to the recent development of wireless communication technologies, application service technologies providing various types of data and contents are serviced. In connection with this, a multimedia service that an user device performs wireless communication with a content storage medium storing various contents such as digital news, books, music, movies, and drama to download desired contents may be a representative example thereof.

However, the multimedia service limits simultaneous users access due to limitation of radio resources. Accordingly, as the number of simultaneous users access increases, the success rate of access is low and also download time is very long, so that limited wireless channels are not efficiently operated.

Recently, a reservation download service method through which a user may download pre-reserved contents in a time zone in which traffic is small or a time zone designated by the user is suggested.

However, in the reservation download service, when a plurality of User Equipments (UEs) pre-reserve to download contents at a particular time, the download (streaming or content download rather than reservation download) by an actual user may be restricted.

Meanwhile, a recent content providing service classifies multimedia contents which are frequently searched for/reproduced by an unspecified high number of users into popular contents and allows the user to easily search for or reproduce popular multimedia contents, but a conventional content searching method classifies contents into popular contents in the unit of contents and provides the contents to users.

The conventional multimedia content searching method has a limitation in meeting the demand of users which desire to easily search for only a particular reproduction interval which is most popular in multimedia contents having a long entire reproduction time and reproduce the found interval.

SUMMARY OF THE INVENTION

Technical Field

An aspect of the present disclosure is to provide an effective content providing service by properly allocating transmission resources in connection with a real time content request and a reserved content request which are received at the same time.

Further, another aspect of the present disclosure is to provide a service to a user by determining some reproduction intervals which are popular over the entire reproduction time of contents as preferred intervals.

In accordance with an aspect of the present disclosure, a service device includes: a request receiver configured to receive a real time content request required to be received in real time or a reserved content request reserved in advance from each of a plurality of User Equipments (UEs) at a particular time; a resource allocation unit configured to allocate transmission resources for transmitting the real time contents or the reserved contents to at least one UE which requests the real time contents and at least one UE which requests the reserved contents; and an allocation controller configured to allocate the resource allocation unit to first allocate transmission resources to at least one UE which requests the real time contents and allocate the remaining transmission resources except for the first allocated transmission resources to at least one UE which requests the reserved contents.

Based on available capacity of the remaining transmission resources, when content capacity of all of the reserved contents requested at the particular time exceeds the available capacity of the remaining transmission resources, the allocation controller may select some of the UEs which request the reserved contents as targets to receive resources and allocates the remaining transmission resources to the selected UEs.

The allocation controller may first select UEs which request reserved contents having small content capacities as the targets to receive the resources from the UEs which request the reserved contents.

When the reserved contents are requested from a particular UE, the allocation controller may allocate transmission resources for transmitting contents which are equal to the reserved contents requested from the particular UE but have smaller content capacities than content capacities of the requested reserved contents.

The allocation controller may first allocate transmission resources to guarantee a transmission rate required by the UEs which request the real time contents and allocate the remaining transmission resources to guarantee a transmission rate required by at least some of the UEs which request the reserved contents.

Based on a maximum transmission rate which can be guaranteed by the remaining transmission resources, when a minimum transmission rate for transmitting all of the reserved contents requested at the particular time exceeds the maximum transmission rate which can be guaranteed by the remaining transmission resources, the allocation controller may select some of the UEs which request the reserved contents as targets to receive resources and allocates the remaining transmission resources to the selected UEs.

In order to allocate transmission resources to as many UEs as possible within the limit of not exceeding the maximum transmission rate which can be guaranteed by the remaining transmission resources, the allocation controller may select UEs which request reserved contents having small content capacities or UEs which request reserved contents through an access network requiring a minimum transmission rate as the targets to receive the resources from the UEs which request the reserved contents.

The allocation controller may allow the remaining UEs except for the UEs selected as the targets to receive the resources from the UEs which request the reserved contents to re-request the reserved contents and select the UEs which re-request the reserved contents as the targets to receive the resources.

In accordance with another aspect of the present disclosure, a method of providing contents by a service device is provided. The method includes: receiving a real time content request required to be received in real time or a reserved content request reserved in advance from each of a plurality of User Equipments (UEs) at a particular time; first allocating transmission resources to at least one UE which requests the real time contents; and additionally allocating the remaining transmission resources except for the first allocation transmission resources to at least one UE which requests the reserved contents.

Based on available capacity of the remaining transmission resources, when content capacities of all of the reserved contents requested at the particular time exceed the available capacity of the remaining transmission resources, the additionally allocating of the remaining transmission resources may include selecting some of the UEs which request the reserved contents as the targets to receive the resources and allocates the remaining resources to the selected UEs.

The additionally allocating of the remaining transmission resources may include first selecting UEs which request reserved contents having small content capacities as the targets to receive the resources from the UEs which request the reserved contents.

When the reserved contents are requested from a particular UE, the additionally allocating of the remaining transmission resources may include allocating transmission resources for transmitting contents which are equal to the reserved contents requested from the particular UE but have smaller content capacities than content capacities of the requested reserved contents.

The first allocating of the transmission resources may include first allocating transmission resources to guarantee a transmission rate required by the UEs which request the real time contents, and the additionally allocating of the remaining transmission resources may include allocating the remaining transmission resources to guarantee a transmission rate required by at least some of the UEs which request the reserved contents.

Based on a maximum transmission rate which can be guaranteed by the remaining transmission resources, when a minimum transmission rate for transmitting all of the reserved contents requested at the particular time exceeds the maximum transmission rate which can be guaranteed by the remaining transmission resources, the additionally allocating of the remaining transmission resources may include selecting some of the UEs which request the reserved contents as targets to receive resources and allocating the remaining transmission resources to the selected UEs.

In order to allocate transmission resources to as many UEs as possible within the limit of not exceeding the maximum transmission rate which can be guaranteed by the remaining transmission resources, the additionally allocating of the remaining transmission resources may include selecting UEs which request reserved contents having small content capacities or UEs which request reserved contents through an access network requiring a minimum transmission rate as the targets to receive the resources from the UEs which request the reserved contents.

The method may further include inducing the remaining UEs except for the UEs selected as the targets to receive the resources from the UEs which request the reserved contents to re-request the reserved contents, wherein the additionally allocating of the remaining transmission resources may include selecting the UEs which re-request the reserved contents as the targets to receive the resources.

In accordance with another aspect of the present disclosure, a content providing service system is provided. The content providing service system includes: a plurality of User Equipments (UEs) configured to request and receive real time contents required to be received in real time or reserved contents reserved in advance from a service device; and the service device configured to, when the real time contents or the reserved contents are requested from each of the plurality of UEs at a particular time, first allocate transmission resources to the UEs which request the real time contents and allocate the remaining transmission resources except for the first allocated transmission resources to at least some of the UEs which request the reserved contents.

In accordance with another aspect of the present disclosure, a content providing service method is provided. The content providing service method includes: making a request for real time contents required to be received in real time or reserved contents reserved in advance to a service device by a plurality of User Equipments (UEs); identifying the request for the real time contents or the reserved contents from each of the plurality of UEs at a particular time by the service device; first allocating transmission resources to the UEs which request the real time contents by the service device; and allocating the remaining transmission resources except for the first allocated transmission resources to at least some of the UEs which request the reserved contents by the service device.

According to the present disclosure, in connection with a real time content request and a reserved content request which are received at the same time, an effective content providing service can be provided by properly allocating transmission resources.

Further, according to the present disclosure, some reproduction intervals which are popular over the entire reproduction time of contents are determined as preferred intervals and then a service is provided to the user.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
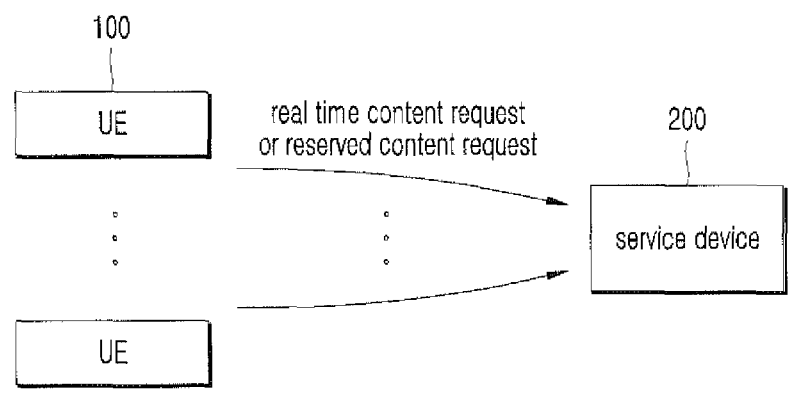
FIG. 1 schematically illustrates a configuration of a content providing service system according to a first embodiment of the present disclosure.

It should be noted that the technical terms in the specification are merely used for describing a specific embodiment but do not limit the scope of the present invention. Further, the technical terms in the specification should be construed as a meaning generally understood by those skilled in the art unless the terms are defined as another meaning and should not be construed as an excessively inclusive meaning or an excessively exclusive meaning. Further, when the technical terms used herein are erroneous technical terms that fail to correctly represent the technical idea of the present invention, the technical terms are to be interpreted as alternative technical terms that can be correctly understood by those skilled in the art. Further, the general terms used herein are to be interpreted as those defined in a generally used dictionary or to have the meaning equal to the contextual meaning, and are not to be interpreted to have excessively narrow meaning.

Hereinafter, the embodiments of the present invention will be described in detail with reference to the accompanying drawings. Throughout the drawings, the same or similar elements are provided with the same reference numeral, and a repetitive description thereof will be omitted. Further, in the following description of the present invention, a detailed description of known technologies incorporated herein will be omitted when it may make the subject matter of the present disclosure rather unclear. Further, it should be noted that the accompanying drawings are intended only for the easy understanding of the technical idea of the present invention, and the spirit of the present invention should not be construed as being limited by the accompanying drawings. In addition to the accompanying drawings, the spirit of the present invention should be construed to cover all modifications, equivalents, and alternatives thereof.

Hereinafter, exemplary embodiments of the present disclosure will be described in detail with reference to the accompanying drawings, equal or similar elements are assigned an equal reference numeral, and an overlapping description thereof will be omitted.

A first embodiment of the present disclosure will be described below with reference to FIGS. 1 to 4.

FIG. 1 illustrates a content providing service system according to a first embodiment of the present disclosure.

As illustrated in FIG. 1, the content providing service system according to the first embodiment of the present disclosure includes User Equipments (UEs) 100 and a service device 200 configured to allow the UEs 100 to receive real time contents or reserved contents.

Further, in addition to the above components, the content providing service system according to the first embodiment of the present disclosure may further include a content providing device (not shown) linked with the service device 200 to provide real time contents or reserved contents to the UE 100.

The UE 100 refers to a user device for receiving real time contents or reserved contents from the service device 200, and may correspond to, for example, a smart phone, a Personal Computer (PC), a notebook PC, a tablet PC, a Personal Digital Assistant (PDA), a TV and the like. However, the UE 100 is not limited thereto and may include all devices which can download contents.

Here, the real time contents refer to various multimedia contents which are required to be received in real time by the UE 100 through a streaming or download scheme and correspond to, for example, movies, TV programs, music videos, music and the like.

Further, the reserved contents refer to multimedia contents which a user reserves in advance through a service page provided by the service device 200.

In connection with this, the UE 100 selects multimedia contents which the UE 100 desires to receive through a service page provided by the service device 200 as reserved contents, configures a reservation time at which the selected reserved contents are received, and makes a request for the reserved contents to the service device 200 when the configured reservation time arrives.

The service device 200 refers to a content server for providing the real time contents or reserved contents according to a request from the UE 100.

In connection with this, the service device 200 may encode the same real time contents and reserved contents into a plurality of file types having different content capacities according to picture quality (for example, low definition or high definition) and store the encoded contents.

Then, the service device 200 may be implemented to select real time contents or reserved contents having proper content capacities in consideration of variable current states of the UE 100 such as the designation of picture quality by the user, the type of accessed network, storage capacity of reserved contents, remaining battery power which can maintain streaming or download operations and the like and to provide the selected real time contents or reserved contents to the UE 100.

Meanwhile, the service device 200 according to the first embodiment of the present disclosure may operate to provide real time contents or reserved contents according to a request from the UE 100.

In connection with this, when reserved contents are simultaneously requested from a plurality of UEs 100 at a particular time, total content capacities of the requested reserved contents may approach or exceed available capacity of transmission resources through which the service device 200 can transmit contents at the particular time, and also a minimum transmission rate for transmitting all of the requested reserved contents may approach or exceed a maximum transmission rate which can be guaranteed by transmission resources of the service device 200 at the particular time.

Accordingly, although the service device 200 receives a real time content request from the UE 100 at the corresponding time, all transmission resources are allocated to the UE 100 which requests the reserved contents, so that the transmission resources cannot be allocated to the UE 100 which requests the real time contents.

Further, when a traffic concentration phenomenon according to a real time content request and a reserved content request continues, the reserved contents as well as the real time contents may not be normally serviced due to the generation of overload in the service device 200.

As described above, in order to allow the service device 200 to normally service the real time contents requested at the same time as well as provide the reserved contents, a scheduling method for efficiently allocating transmission resources in response to the real time content request or the reserved content request received at the same time should be considered.

To this end, according to an embodiment of the present disclosure, a method of first allocating transmission resources to UEs which request real time contents, selecting at least one of the UEs which request reserved contents, and allocating the remaining transmission resources except for the first allocated transmission resources to the selected UEs in response to a real time content request and a reserved content request received at the same time is suggested.

Specifically, the first embodiment described below suggests a method of first allocating transmission resources to the UEs which request the real time contents, selecting at least some of the UEs which request the reserved contents based on available capacity of the remaining transmission resources, and allocating the transmission resources to the selected UEs. Further, the second embodiment described below suggests a method of first allocating transmission resources to guarantee a transmission rate required by the UEs 100 which request the real time contents and then allocating the remaining resources to guarantee a transmission rate required by the UEs which request the reserved contents.

According to the first embodiment of the present disclosure, the UE 100 makes a request for real time contents or reserved contents to the service device 200.

More specifically, the UEs 100 access the service device 200 to make a request for real time contents according to a user's request. Alternatively, when a pre-configured reservation time arrives, the UEs 100 access the service device 200 to make a request for reserved contents regardless of a user's request.

At this time, the UE 100 may insert a flag for distinguishing the real time content request from the reserved content request into a request message to be transmitted to the service device 200 and transmit the request message.

In connection with this, the service device 200 identifies a request received from the UE 100.

More specifically, the service device 200 identifies real time content requests and reserved content requests which are simultaneously received from a plurality of UEs 100 at a particular time.

Further, the service device 200 first allocates transmission resources for transmission of the real time contents.

More specifically, the service device 200 identifies total transmission resources which can be allocated at the particular time and first allocates some transmission resources of the identified total transmission resources for transmission of the real time contents to the corresponding UEs 100 which request the real time contents.

Further, the service device 200 additionally allocates transmission resources for transmission of the reserved contents.

More specifically, when content capacities of all of the reserved contents requested at the particular time exceed available capacity of the remaining transmission resources except for the transmission resources which have been first allocated for the transmission of the real time contents among the total transmission resources, the service device 200 selects only some UEs 100 from the UEs 100 which request the reserved contents as targets to receive resources and allocates the remaining transmission resources to the selected UEs 100.

At this time, in connection with the targets to receive the resources, the service device 200 first selects the UEs 100 which re-request the reserved contents as the targets to receive the resources from the UEs which request the reserved contents or first selects the UEs 100 which request reserved contents having small content capacities as the target to receive the resources.

Further, the service device 200 induces re-access of the remaining UEs 100 except for the UEs 100 selected as the targets to receive the resources among the UEs 100 having requested the reserved contents, so as to allow the UEs 100 to re-request the reserved contents.

Meanwhile, when content capacities of all of the reserved contents requested at the particular time do not exceed available capacities of the remaining transmission resources, the service device 200 allocates the transmission resources to all of the UEs 100 which request the reserved contents.

Further, the service device 200 transmits real time contents and reserved contents to the UEs 100.

More specifically, when transmission resources are allocated in response to the real time content request and the reserved content request which are received at the particular time, the service device 200 transmits the real time contents or the reserved contents to the corresponding UEs 100 through the allocated transmission resources.

Figure 2:
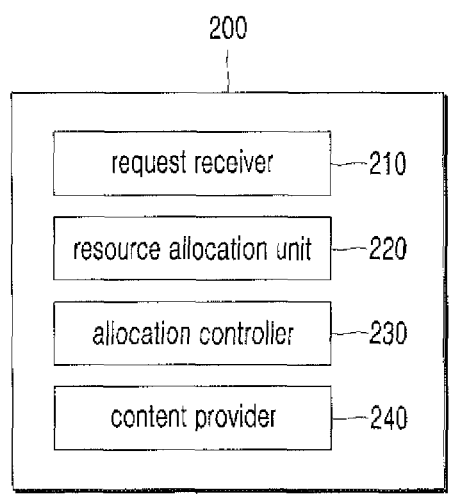
FIG. 2 illustrates a service device according to the first embodiment of the present disclosure.

Hereinafter, a configuration of the service device 200 according to the first embodiment of the present disclosure will be described in more detail with reference to FIG. 2.

The service device 200 includes a request receiver 210 configured to receive a real time content request or a reserved content request, a resource allocation unit 220 configured to allocate transmission resources for transmission of real time contents and transmission of reserved contents, and an allocation controller 230 configured to control allocation of transmission resources for transmission of reserved contents.

In addition to the above listed components, the service device 200 may further include a content provider 240 for transmitting real time contents or reserved contents to the corresponding UEs 100 through allocated transmission resources.

Here, each of the request receiver 210, the resource allocation unit 220, the allocation controller 230, and the content provider 240 included in the service device 200 may be implemented by a software module executed by a processor or implemented by a combination thereof.

The request receiver 210 identifies requests received from the UEs 100.

More specifically, the request receiver 210 identifies whether corresponding requests are real time content requests or reserved content requests through flags inserted into request messages simultaneously received from a plurality of UEs 100 at a particular time.

The resource allocation unit 220 first allocates transmission resources for transmission of the real time contents.

More specifically, the resource allocation unit 220 identifies total transmission resources which can be allocated at the particular time and first allocates some transmission resources of the identified total transmission resources for transmission of the real time contents to the corresponding UEs 100 which request the real time contents.

Further, the resource allocation unit 220 additionally allocates transmission resources for transmission of the reserved contents.

More specifically, the allocation controller 230 identifies the remaining transmission resources except for the transmission resources which have been first allocated for the transmission of the real time contents among the total transmission resources, and also identifies content capacities of all of the reserved contents requested at the particular time.

In connection with this, when it is identified that the content capacities of all of the reserved contents requested at the particular time exceed available capacity of the remaining transmission resources, the allocation controller 230 selects only some of the UEs which request the reserved contents as targets to receive resources and allows the resource allocation unit 220 to allocate the remaining transmission resources only to the selected targets to receive the resources.

Here, in connection with the targets to receive the resources, the allocation controller 230 may first select the UEs 100 which re-request the reserved contents as the targets to receive the resources from the UEs which request the reserved contents.

Further, the allocation controller 230 first selects the UEs 100 which request reserved contents having small content capacities as the targets to receive the resources, so that the transmission resources may be allocated to as many UEs 100 as possible within the limit of the available capacity of the remaining transmission resources identified at the particular time.

In addition, as another method for allocating the transmission resources to as many UEs 100 as possible within the limit of the available capacity of the remaining resources identified at the particular time, the allocation controller 230 may first allocate transmission resources for transmission of contents which are the same as the reserved contents requested from the UEs 100 or encoded into low definition and small capacity contents to the corresponding UE s100.

In connection with this, the allocation controller 230 allows the UEs 100 to re-request contents which can be combined with the low definition contents and thus may allow the UEs 100 to generate the same contents as the initially requested reserved contents through a combination of the contents received by the initial request and the contents received by the re-request.

Further, the allocation controller 230 induces re-access of the remaining UEs 100 except for the UEs 100 selected as the targets to receive the resources from the UEs 100 which request the reserved contents, so as to allow the remaining UEs 100 to re-request the reserved contents.

At this time, the allocation controller 230 determines a re-request time point of the reserved contents to induce the re-access of the UEs 100.

In this event, the re-request time point is determined as a time point after a maximum time interval during which it is expected that there will be no request for the reserved contents, or a time point after a unit time interval in view of a reservation state of the reserved contents in the service device 200.

In connection with this, when it is identified that the re-request time point according to the access inducement of the service device 200 arrives, the UE 100 inserts a flag for distinguishing the re-request of the reserved contents into a request message to be transmitted to the service device 200 and makes a request for the reserved contents.

Meanwhile, when content capacities of all of the reserved contents requested at a particular time do not exceed an available capacity of the remaining transmission resources, the allocation controller 230 allows the resource allocator 220 to allocate transmission resources to all the UEs 100 which request the reserved contents.

The content provider 240 transmits real time contents and reserved contents to the UEs 100.

More specifically, when transmission resources are allocated in response to the real time content requests and the reserved content requests which are received at the particular time, the content provider 240 transmits the real time contents or the reserved contents to the corresponding UEs 100 through the allocated transmission resources.

As described above, according to the content providing service system according to an embodiment of the present disclosure, in response to the real time content request and the reserved content request simultaneously received at the same time, transmission resources are first allocated only to the UEs 100 which request the real time contents, and at least some of the UEs which request the reserved contents are selected and transmission resources are allocated to the selected UEs 100. Further, the re-access of the UEs 100 which have not received transmission resources is induced, so that an effective content providing service can be provided.

Figure 3:
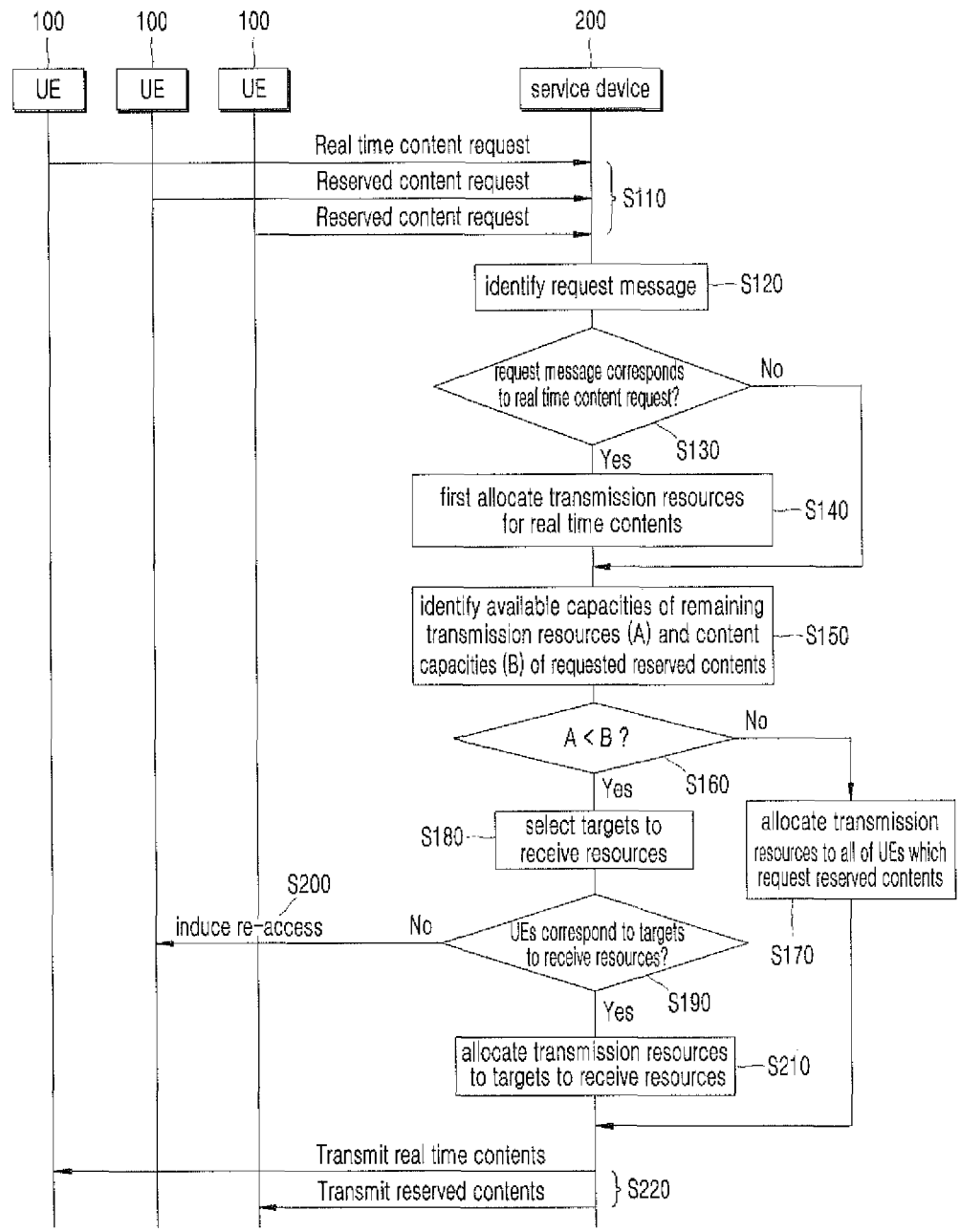
FIG. 3 is a flowchart schematically describing an operation flow in the content providing service system according to the first embodiment of the present disclosure.
Figure 4:
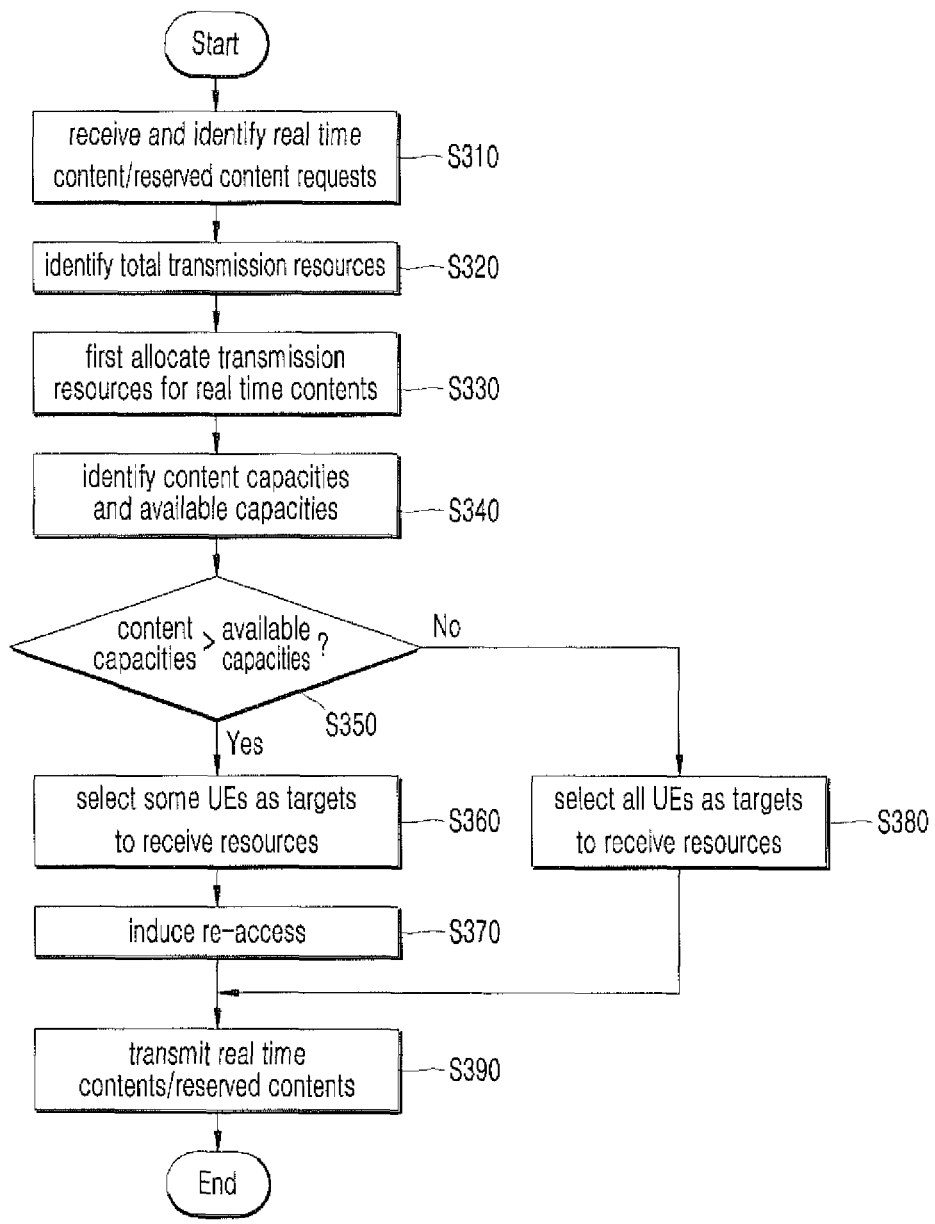
FIG. 4 is a flowchart schematically illustrating operations of the service device according to the first embodiment of the present disclosure.

Hereinafter a content providing service method according to the first embodiment of the present disclosure will be described with reference to FIGS. 3 to 4. Here, the configurations identical to those illustrated in FIGS. 1 to 2 are assigned the same corresponding reference numerals for the convenience of a description.

First, an operation flow in the content providing service system according to the first embodiment of the present disclosure will be described with reference to FIG. 3.

A plurality of UEs 100 access the service device 200 to make a request for real time contents according to a user's request. Alternatively, when a pre-configured reservation time arrives, the UEs 100 access the service device 200 to make a request for reserved contents regardless of a user's request in step S110.

Then, the service device 200 identifies whether corresponding requests are real time content requests or reserved content requests through flags inserted into request messages simultaneously received from a plurality of UEs 100 at a particular time in step S120.

At this time, the service device 200 identifies total transmission resources which can be allocated at the particular time and, when the request message is the real time content request, the service device 200 first allocates some transmission resources of the identified total transmission resources to guarantee a transmission rate required by the UE 100 which requests the real time contents in steps S130 to S140.

Then, in connection with allocation of transmission resources for the real time content request and the reserved content request which are simultaneously received, the service device 200 identifies the remaining transmission resources except for the transmission resources which have been first allocated for transmission of the real time contents among the total transmission resources and also identifies content capacities of all of the reserved contents requested at the particular time in step S150.

At this time, when the content capacities of all of the reserved contents requested at the particular time do not exceed an available capacity of the remaining transmission resource except for the transmission resources which have been first allocated for the transmission of the real time contents among the total transmission resources, the service device 200 allocates the transmission resources to all of the UEs 100 which request the reserved contents in steps S160 to S170.

When the content capacities of all of the reserved contents requested at the particular time exceed the available capacity of the remaining transmission resources except for the transmission resources which have been first allocated for the transmission of the real time contents among the total transmission resources, the service device 200 selects only some UEs 100 from the UEs 100 which request the reserved contents as targets to receive resources in steps S160 and S180.

At this time, in connection with the targets to receive the resources, the service device 200 first selects the UEs 100 which re-request the reserved contents as the targets to receive the resources from the UEs which request the reserved contents or first selects the UEs 100 which request reserved contents having small content capacities as the target to receive the resources.

Then, in order to transmit the reserved contents requested by the UEs 100 selected as the targets to receive the resources, the service device 200 allocates the remaining transmission resources to the corresponding UEs 100 in steps S190 and S210.

At this time, the service device 200 induces re-access of the remaining UEs 100 except for the UEs 100 selected as the targets to receive the resources among the UEs 100 which request the reserved contents, so as to allow the remaining UEs 100 to re-request the reserved contents in step S190 and S200.

Further, when transmission resources are allocated in response to the real time content request and the reserved content request which are received at the particular time, the service device 200 transmits the real time contents or the reserved contents to the corresponding UEs 100 through the allocated transmission resources in step S220.

Hereinafter, an operation of the service device 200 according to the first embodiment of the present disclosure will be described in detail with reference to FIG. 4.

First, the request receiver 210 identifies whether corresponding requests are real time content requests or reserved content requests through flags inserted into request messages simultaneously received from a plurality of UEs 100 at a particular time in step S310.

Then, the resource allocation unit 220 identifies total transmission resources which can be allocated at the particular time and first allocates some transmission resources of the identified total transmission resources for transmission of the real time contents to the corresponding UEs 100 which request the real time contents in steps S320 to S330.

Subsequently, the allocation controller 230 identifies the remaining transmission resources except for the transmission resources which have been first allocated for the transmission of the real time contents among the total transmission resources, and also identifies content capacities of all of the reserved contents requested at the particular time in step S340.

At this time, when it is identified that the content capacities of all of the reserved contents requested at the particular time exceed available capacity of the remaining transmission resources, the allocation controller 230 selects only some of the UEs which request the reserved contents as targets to receive resources and allows the resource allocation unit 220 to allocate the remaining transmission resources only to the selected targets to receive the resources in steps S350 to S360.

In connection with the targets to receive the resources, the allocation controller 230 may first select the UEs 100 which re-request the reserved contents as the targets to receive the resources from the UEs which request the reserved contents.

Further, the allocation controller 230 first selects the UEs 100 which request reserved contents having small content capacities as the targets to receive the resources, so that the transmission resources may be allocated to as many UEs 100 as possible within the limit of the available capacity of the remaining transmission resources identified at the particular time.

In addition, the allocation controller 230 induces re-access of the remaining UEs 100 except for the UEs 100 selected as the targets to receive the resources from the UEs 100 which request the reserved contents, so as to allow the remaining UEs 100 to re-request the reserved contents in step S370.

Meanwhile, when the content capacities of all of the reserved contents requested at the particular time do not exceed the available capacity of the remaining transmission resources, the allocation controller 230 allows the resource allocator 220 to allocate transmission resources to all of the UEs 100 which request the reserved contents in step S380.

Thereafter, when transmission resources are allocated in response to the real time content request and the reserved content request which are received at the particular time, the content provider 240 transmits the real time contents or the reserved contents to the corresponding UEs 100 through the allocated transmission resources in step S390.

As described above, according to the content providing service method according to the first embodiment of the present disclosure, in response to the real time content request and the reserved content request simultaneously received at the same time, transmission resources are first allocated only to the UE 100 which request the real time contents, and at least some of the UEs which request the reserved contents are selected and transmission resources are allocated to the selected UEs 100. Further, the re-access of the UEs 100 which have not received transmission resources is induced, so that an effective content providing service can be provided.

Hereinafter, a second embodiment of the present disclosure will be described with reference to FIGS. 1, 2, 5, and 6, and descriptions of matters same as the technical features described through the first embodiment above will be omitted.

The content providing service system according to the second embodiment of the present disclosure includes the same components as those of the first embodiment such as the UE 100 and the service device 200 which allows the UE 100 to receive real time contents or reserved contents as illustrated in FIG. 1.

The second embodiment of the present disclosure suggests a method of first allocating transmission resources to guarantee a transmission rate required by the UE 100 which requests the real time contents and allocating the remaining resources to guarantee a transmission rate required by the UE which request the reserved contents in response to a real time content request and a reserved content request, which will be described below in detail.

The UE 100 makes a request for real time contents or reserved contents to the service device 200, and the service device 200 identifies the request received from the UE 100.

Further, the service device 200 identifies total transmission resources which can be allocated at a particular time and first allocates some transmission resources of the identified total transmission resources to guarantee a transmission rate required by the UE 100 which requests the real time contents.

In addition, when transmission resources for transmission of the real time contents are first allocated, the service device 200 additionally allocates transmission resources for transmission of the reserved contents.

More specifically, the service device 200 identifies a maximum transmission rate guaranteed by the remaining transmission resources except for the transmission resources which have been first allocated for the transmission of the real time contents among the total transmission resources, and also identifies a minimum transmission rate required for transmitting all of the reserved contents requested at the particular time.

At this time, when the minimum transmission rate required for transmitting all of the reserved contents requested at the particular time does not exceed a maximum transmission rate which can be guaranteed by the remaining transmission resources, the service device 200 allocates transmission resources to all of the UEs 100 which request the reserved contents.

When it is identified that the minimum transmission rate required for transmitting all of the reserved contents requested at the particular time exceeds the maximum transmission rate which can be guaranteed by the remaining transmission resources, the service device 200 selects only some of the UEs 100 which request the reserved contents as targets to receive resources and then allocates the remaining transmission resources to guarantee a transmission rate required by the UEs 100 selected as the targets to receive the resources.

In connection with this, as described above, the service device 200 induces re-access of the remaining UEs 100 except for the UEs 100 selected as the targets to receive the resources among the UEs 100 which request the reserved contents, so as to allow the remaining UEs 100 to re-request the reserved contents.

Further, the service device 200 transmits real time contents and reserved contents to the UEs 100.

More specifically, when transmission resources are allocated in response to the real time content request and the reserved content request which are received at the particular time, the service device 200 transmits the real time contents or the reserved contents to the corresponding UEs 100 at a transmission rate supported by the allocated transmission resources.

Hereinafter, the configuration of the service device 200 according to the second embodiment of the present disclosure will be described in more detail with reference to FIG. 2, and descriptions of matters which are the same as the technical features described through the first embodiment above will be omitted.

The service device 200 includes the request receiver 210 configured to receive a real time content request or a reserved content request, the resource allocation unit 220 configured to allocate transmission resources for transmission of real time contents and reserved contents, and the allocation controller 230 configured to control allocation of transmission resources for transmission of reserved contents.

In addition to the above listed components, the service device 200 may further include the content provider 240 for transmitting real time contents or reserved contents to the corresponding UE 100 through allocated transmission resources.

The request receiver 210 identifies a request received from the UE 100.

The resource allocation unit 220 first allocates transmission resources for transmission of the real time contents in response to the request from the UE 100.

More specifically, the resource allocation unit 220 identifies total transmission resources which can be allocated at a particular time and first allocates some transmission resources of the identified total transmission resources to guarantee a transmission rate required by the UE 100 which requests the real time contents.

Further, when transmission resources for transmission of the real time contents are first allocated, the resource allocation unit 220 additionally allocates transmission resources for transmission of the reserved contents.

More specifically, the allocation controller 230 identifies a maximum transmission rate guaranteed by the remaining transmission resources except for the transmission resources which have been first allocated for the transmission of the real time contents among the total transmission resources, and also identifies a minimum transmission rate required for transmitting all of the reserved contents requested at the particular time.

At this time, when the minimum transmission rate required for transmitting all of the reserved contents requested at the particular time does not exceed a maximum transmission rate which can be guaranteed by the remaining transmission resources, the allocation controller 230 allows the resource allocation unit 220 to allocate transmission resources to all of the UEs 100 which request the reserved contents.

When it is identified that the minimum transmission rate required for transmitting all of the reserved contents requested at the particular time exceeds the maximum transmission rate which can be guaranteed by the remaining transmission resources, the allocation controller 230 selects only some of the UEs 100 which request the reserved contents as targets to receive resources and then allows the resource allocation unit 220 to allocate the remaining transmission resources to guarantee a transmission rate required by the UEs 100 selected as the targets to receive the resources.

For example, in a state where real time content requests are received from 10 users and reserved content requests are received from 990 users simultaneously at a particular time, when transmission resources supporting a transmission rate of 40 MBPS are first allocated to all of the users which request the real time contents among total transmission resources which can support a transmission rate of 100 MBPS, the remaining transmission resources for supporting a transmission rate of 60 MBPS should be allocated to all of the 990 users which request the reserved contents.

However, when a minimum transmission rate required for transmitting all of the reserved contents requested by the 990 users is 30 MBPS, the remaining transmission resources cannot guarantee the corresponding transmission rate, so that only some of the 990 users are selected as targets to receive resources and the transmission resources are allocated to the selected users.

Here, in connection with the selection of the targets to receive the resources, the allocation controller 230 may first select the UEs 100, which have not been selected as the targets to receive the resources before the particular time from the UEs 100 which request the reserved contents and thus re-request the reserved contents, as the targets to receive the resources.

Further, the allocation controller 230 may select the UEs 100 which request reserved contents having small content capacities or UEs 100 which request reserved contents through an access network (for example, 3G or WiFi) requiring a minimum transmission rate to transmit the same content capacity as the targets to receive the resources from the UEs which request the reserved contents.

Accordingly, the allocation controller 230 may allocate the transmission resources to as many UEs 100 as possible within the limit in which a minimum transmission rate required for transmitting all of the reserved contents requested at the particular time does not exceed a maximum transmission rate which can be guaranteed by the remaining transmission resources.

Further, as another method for allocating the transmission resources to as many UEs 100 as possible within the limit of not exceeding the maximum transmission rate which can be guaranteed by the remaining transmission resources, the allocation controller 230 may first allocate transmission resources for transmission of contents which are the same as the reserved contents requested from the UE 100s or encoded into small capacity contents to the corresponding UEs 100.

Further, the allocation controller 230 allows the UE 100s to re-request contents which can be combined with the low definition contents and thus may allow the UEs 100 to generate the same contents as initially requested reserved contents through a combination of the contents received by the initial request and the contents received by the re-request.

Meanwhile, the allocation controller 230 induces re-access of the remaining UEs 100 except for the UEs 100 selected as the targets to receive the resources from the UEs 100 which request the reserved contents, so as to allow the remaining UEs 100 to re-request the reserved contents.

At this time, the allocation controller 230 may induce the re-access of the remaining UEs 100 except for the UEs selected as the targets to receive the resources, so as to allow the remaining UEs 100 to re-request the reserved contents through an access network requiring a slower transmission rate to transmit the same content capacity in comparison with the currently accessed network.

In connection with this, the allocation controller 230 determines a re-request time point of the reserved contents to induce the re-access of the UE 100s.

In this event, the re-request time point is determined as a time point after a maximum time interval during which it is expected that there will be no request for the reserved contents, or a time point after a unit time interval in view of a reservation state of the reserved contents in the service device 200.

In connection with this, when it is identified that the re-request time point according to the access inducement of the service device 200 arrives, the UE 100 inserts a flag for distinguishing the re-request of the reserved contents into a request message to be transmitted to the service device 200 and makes a request for the reserved contents.

The content provider 240 transmits real time contents and reserved contents to the UEs 100.

More specifically, when transmission resources are allocated in response to the real time content request and the reserved content request which are received at the particular time, the content provider 240 transmits the real time contents or the reserved contents to the corresponding UEs 100 at a transmission rate supported by the allocated transmission resources.

As described above, according to the content providing service method according to the second embodiment of the present disclosure, in response to the real time content request and the reserved content request simultaneously received at the same time, transmission resources are first allocated to guarantee a transmission rate required by the UEs 100 which request the real time contents, and the remaining transmission resources are allocated to guarantee a transmission rate required by at least some of the UEs which request the reserved contents based on a minimum transmission rate required for transmitting all of the reserved contents and a maximum transmission rate which can be guaranteed by the remaining transmission resources. Further, the re-access of the UEs 100 which have not received transmission resources is induced, so that an effective content providing service can be provided.

Figure 5:
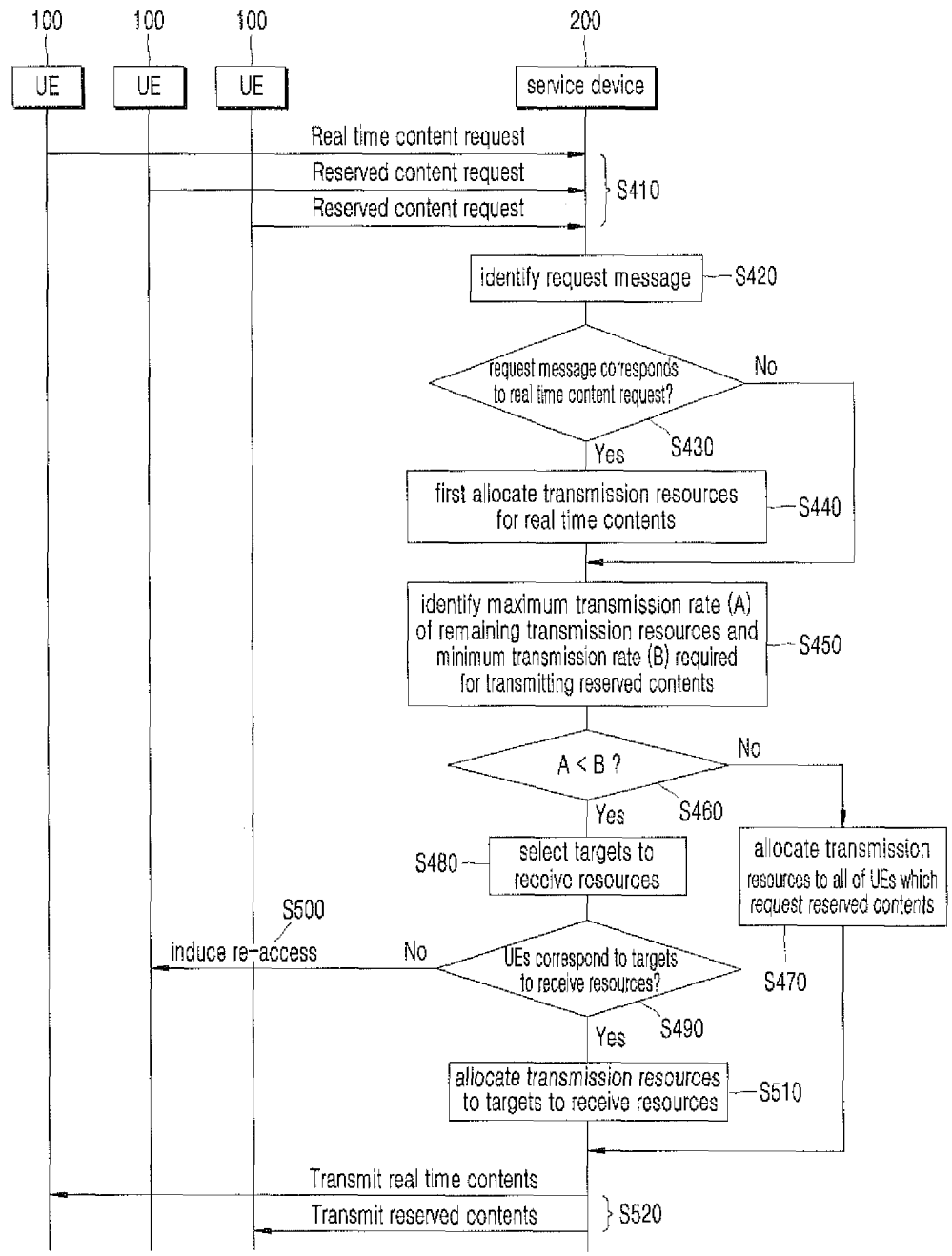
FIG. 5 is a flowchart schematically describing an operation flow in a content providing service system according to a second embodiment of the present disclosure.
Figure 6:
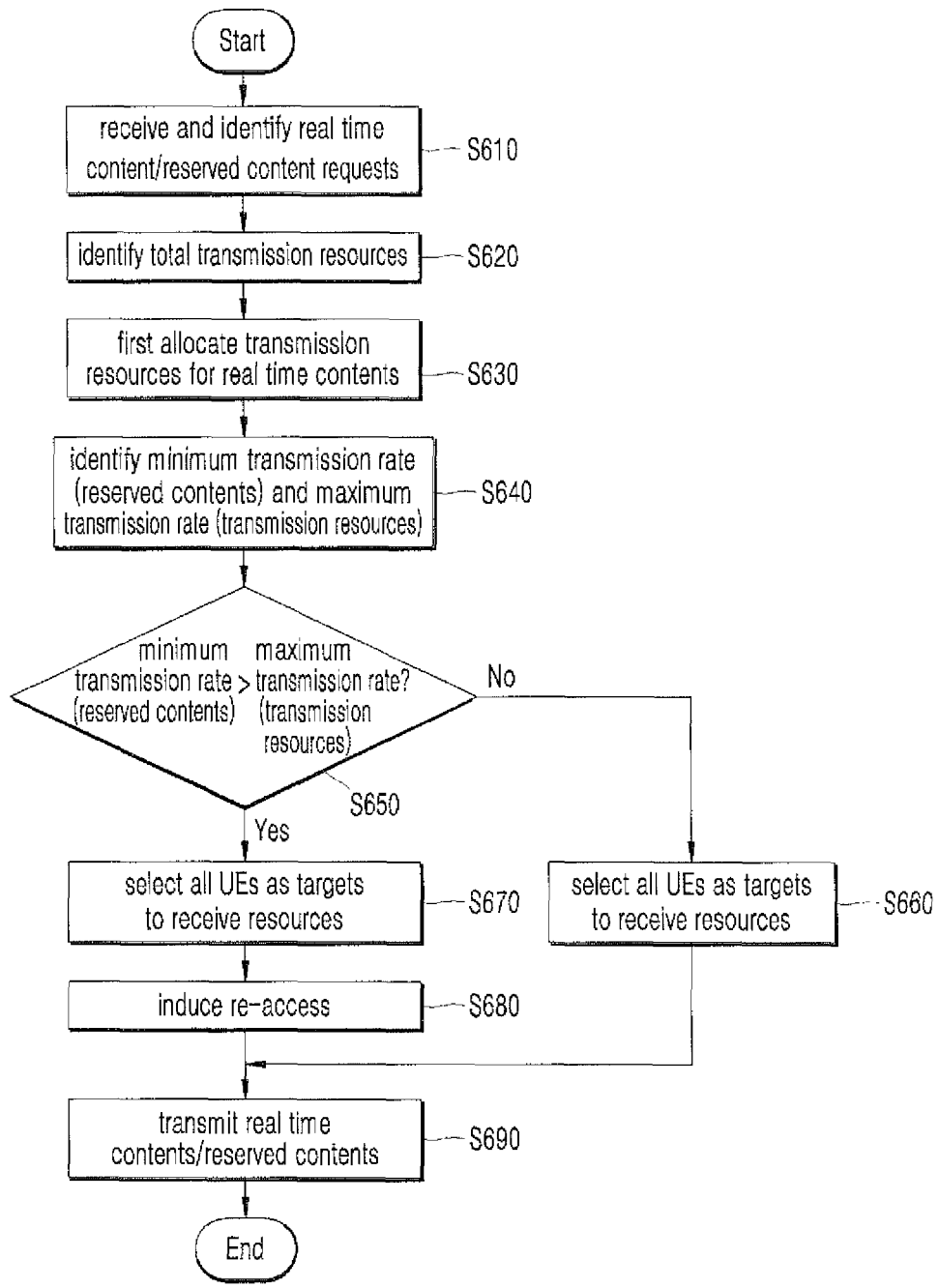
FIG. 6 is a flowchart schematically illustrating operations of a service device according to the second embodiment of the present disclosure.

Hereinafter, a content providing service method according to the second embodiment of the present disclosure will be described with reference to FIGS. 5 to 6. Here, the configurations identical to those illustrated in FIGS. 1 to 2 are assigned the same corresponding reference numerals for the convenience of description, and descriptions of matters same as the technical features already described in the first embodiment will be omitted.

First, an operation flow in the content providing service system according to the second embodiment of the present disclosure will be described with reference to FIG. 5.

A plurality of UEs 100 access the service device 200 to make a request for real time contents according to a user's request. Alternatively, when a pre-configured reservation time arrives, the UEs 100 access the service device 200 to make a request for reserved contents regardless of a user's request in step S410.

At this time, the UE 100 may insert a flag for distinguishing a real time content request and a reserved content request into a request message to be transmitted to the service device 200 and transmit the request message.

Then, the service device 200 identifies whether corresponding requests are the real time content requests or the reserved content requests through flags inserted into request messages simultaneously received from a plurality of UEs 100 at a particular time in step S420.

At this time, the service device 200 identifies total transmission resources which can be allocated at the particular time and, when the request message is the real time content request, the service device 200 first allocates some transmission resources of the identified total transmission resources to guarantee a transmission rate required by the UEs 100 which request the real time contents in steps S1430 to S440.

Further, in connection with allocation of transmission resources for the real time content request and the reserved content request which are simultaneously received, the service device 200 identifies a maximum transmission rate guaranteed by the remaining transmission resources except for the transmission resources which have been first allocated for transmission of the real time contents among the total transmission resources and also identifies a minimum transmission rate required for transmitting all of the reserved contents requested at the particular time in step S450.

At this time, when the minimum transmission rate required for transmitting all of the reserved contents requested at the particular time does not exceed the maximum transmission rate which can be guaranteed by the remaining transmission resources, the service device 200 allocates transmission resources to all of the UEs 100 which request the reserved contents in steps S460 to S470.

When the minimum transmission rate required for transmitting all of the reserved contents requested simultaneously with the real time contents exceeds the maximum transmission rate which can be guaranteed by the remaining transmission resources, the service device 200 selects only some of the UEs which request the reserved contents as targets to receive resources in steps S460 and S480.

At this time, in connection with the selection of the targets to receive the resources, the service device 200 may first select the UEs 100, which have not been selected as the targets to receive the resources before the particular time from the UEs 100 having requested the reserved contents and thus re-request the reserved contents, as the target to receive the resources.

Then, in order to guarantee a transmission rate requested by the UEs 100 selected as the targets to receive the resources, the service device 200 allocates the remaining transmission resources to the corresponding UEs 100 in steps S490 and S510.

In connection with this, as described above, the service device 200 induces re-access of the remaining UEs 100 except for the UEs 100 selected as the targets to receive the resources among the UEs 100 which request the reserved contents, so as to allow the remaining UEs 100 to re-request the reserved contents in steps S490 and S500.

Thereafter, when transmission resources are allocated in response to the real time content request and the reserved content request which are received at the particular time, the service device 200 transmits the real time contents or the reserved contents to the corresponding UEs 100 at a transmission rate supported by the allocated transmission resources in step S520.

Hereinafter, an operation of the service device 200 according to the second embodiment of the present disclosure will be described in detail with reference to FIG. 6.

First, the request receiver 210 identifies whether corresponding requests are real time content request or reserved content requests by checking flags inserted into request messages simultaneously received from a plurality of UEs 100 at a particular time.

At this time, the request receiver 210 may identify whether the corresponding request is the real time content request or the reserved content request according to whether reservation information mapped to identification information of the UE 100 having transmitted the request message exists or not.

Further, the resource allocation unit 220 identifies total transmission resources which can be allocated at the particular time and first allocates some transmission resources of the identified total transmission resources to guarantee a transmission rate required by the UEs 100 which request the real time contents in steps S620 to S630.

Then, the allocation controller 230 identifies a maximum transmission rate guaranteed by the remaining transmission resources except for the transmission resources which have been first allocated for the transmission of the real time contents among the total transmission resources, and also identifies a minimum transmission rate required for transmitting all of the reserved contents requested at the particular time in step S640.

At this time, when the minimum transmission rate required for transmitting all of the reserved contents requested at the particular time does not exceed the maximum transmission rate which can be guaranteed by the remaining transmission resources, the allocation controller 230 allows the resource allocation unit 220 to allocate transmission resources to all of the UEs 100 which request the reserved contents in steps S650 to S660.

When the minimum transmission rate required for transmitting all of the reserved contents requested at the particular time exceeds the maximum transmission rate which can be guaranteed by the remaining transmission resources, the allocation controller 230 allows the resource allocation unit 220 to allocate transmission resources for guaranteeing a transmission rate required by the UEs 100 selected as the targets to receive the resources in steps S650 to S670.

Meanwhile, as described above, the allocation controller 230 induces re-access of the remaining UEs 100 except for the UEs 100 selected as the targets to receive the resources from the UEs 100 which request the reserved contents, so as to allow the remaining UEs 100 to re-request the reserved contents in step S680.

At this time, the allocation controller 230 may induce re-access of the remaining UEs 100 except for the UEs 100 selected as the targets to receive the resources, so as to allow the remaining UEs 100 to re-request the reserved contents through an access network requiring a slower transmission rate to transmit the same content capacity in comparison with the currently accessed network.

Thereafter, when transmission resources are allocated in response to the real time content request and the reserved content request which are received at the particular time, the content provider 240 transmits the real time contents or the reserved contents to the corresponding UEs 100 at a transmission rate supported by the allocated transmission resources in step S690.

As described above, according to the content providing service method according to the second embodiment of the present disclosure, in response to the real time content request and the reserved content request simultaneously received at the same time, transmission resources are first allocated to guarantee a transmission rate required by the UEs 100 which request the real time contents, and the remaining transmission resources are allocated to guarantee a transmission rate required by at least some of the UEs which request the reserved contents based on a minimum transmission rate required for transmitting all of the reserved contents and a maximum transmission rate which can be guaranteed by the remaining transmission resources. Further, the re-access of the UEs 100 which have not received transmission resources is induced, so that an effective content providing service can be provided.

Hereinafter, a third embodiment of the present disclosure will be described below with reference to FIGS. 7 to 10.

Figure 7:
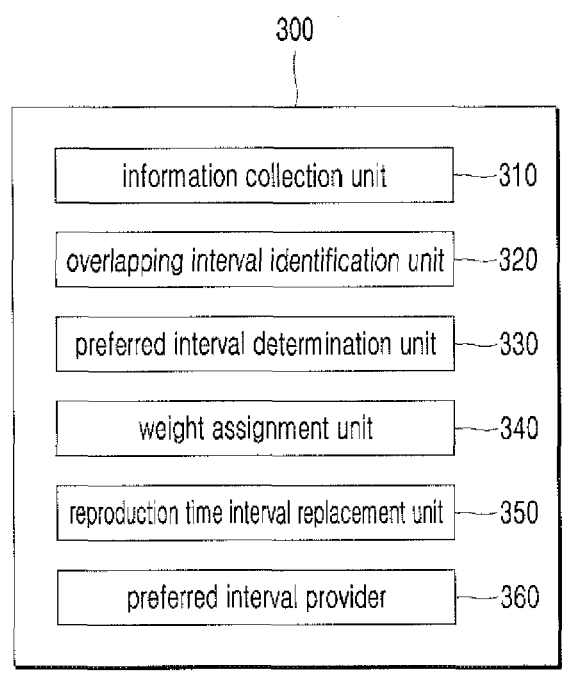
FIG. 7 is a control block diagram illustrating a preferred content interval service device according to a third embodiment of the present disclosure.

FIG. 7 illustrates a preferred content interval service device 300 according to the third embodiment of the present disclosure.

The preferred content interval service device 300 according to the third embodiment of the present disclosure includes an information collection unit 310 configured to collect reproduction time interval information generated in accordance with at least some reproduction time intervals of particular contents reproduced by at least one UE 100, an overlapping interval identification unit 320 configured to identify an overlapping interval among reproduction time intervals based on a plurality of collected reproduction time interval information, and a preferred interval determination unit 330 configured to determine a preferred interval of the particular contents among the overlapping intervals based on a number of times by which identified overlapping intervals overlap.

When at least some reproduction time intervals of the corresponding contents are reproduced in an unspecified UE with respect to each of the contents, the information collection unit 310 may collect reproduction time interval information related to the reproduction time intervals.

Here, the reproduction time interval information may be log type information including at least one of device identification information of the UE having reproduced the corresponding contents, a reproduction time interval (for example, reproduction start time information (for example, 2 minutes and 30 seconds), reproduction end time information (for example, 10 minutes and 10 seconds)), and information indicating whether a connection with preview contents is made.

That is, when at least some reproduction time intervals of the corresponding contents are reproduced in an unspecified UE with respect to each of the contents, the information collection unit 310 may collect reproduction time interval information related to the reproduction time intervals. Then, the preferred content interval service device 300 may collect and manage a plurality of reproduction time interval information according to each of the contents.

Hereinafter, for the convenience of descriptions, a case where at least some reproduction time intervals of the same particular contents are reproduced in UEs 1, 2, and 3 of at least one UEs 100 will be described.

As at least some reproduction time intervals of particular contents are reproduced in unspecified UEs, for example, UEs 1, 2, and 3, the information collection unit 310 may collect reproduction time interval information related to the reproduction time intervals.

For example, a case where the entire reproduction time intervals of particular contents are T (for example, 60 minutes) is described with reference to FIG. 10. The information collection unit 310 may collect four pieces of reproduction time interval information 1, 2, 3, and 4 with respect to the particular contents and each of the four pieces of reproduction time interval information may include reproduction time intervals 1, 2, 3, and 4 as illustrated in FIG. 10.

The overlapping interval identification unit 320 identifies an overlapping interval between reproduction time intervals based on a plurality of pieces of reproduction time interval information collected by the information collection unit 310.

Figure 10:
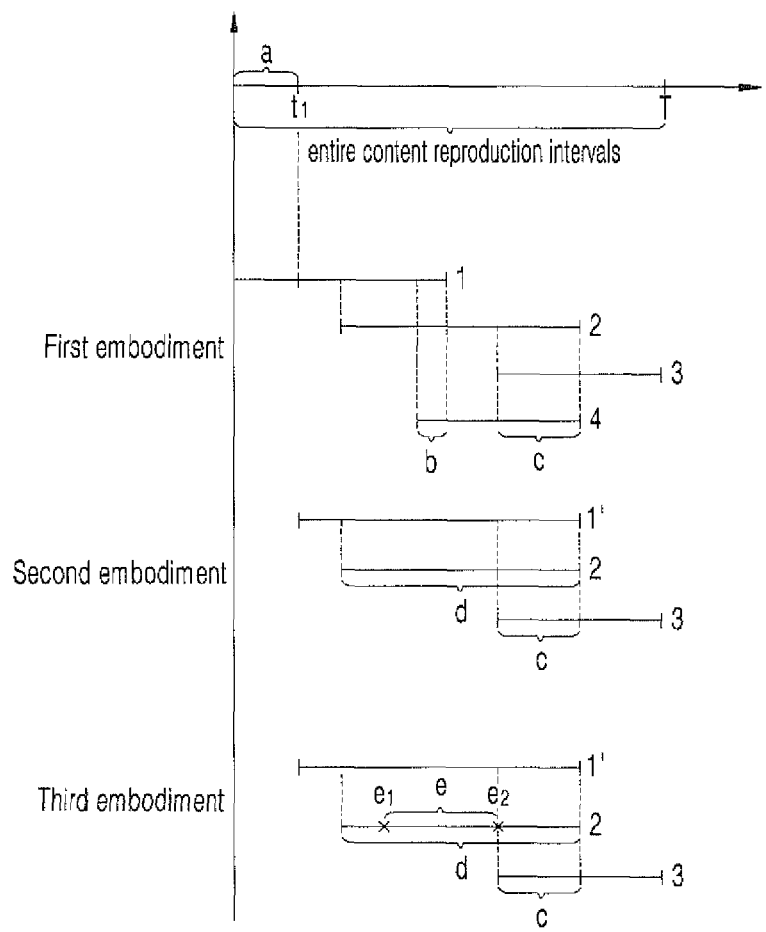
FIG. 10 illustrates an example of a process of determining a preferred interval in connection with particular contents according to the third embodiment of the present disclosure.

That is, referring to FIG. 10, the overlapping interval identification unit 320 may identify overlapping intervals among reproduction time intervals 1, 2, 3, and 4.

Further, with respect to each of a plurality of pieces of reproduction time interval information collected by the information collection unit 310, it is preferable that the overlapping interval identification unit 320 identifies overlapping intervals among the reproduction time intervals after excluding a particular overlapping exclusion interval from the reproduction time intervals of the reproduction time interval information.

Here, the particular overlapping exclusion interval may include an interval from a content reproduction start position of the particular contents to a position where a preset content initial reproduction time elapses.

When the user reproduces contents which the user first encounters, the user generally reproduces the contents from the beginning. Accordingly, it is highly likely that a beginning part of the contents is included in reproduction time intervals according to a plurality of pieces of collected reproduction time interval information. Accordingly, it is preferable to exclude a beginning part of contents generally/typically reproduced when counting the number of overlaps to determine a preferred interval in terms of the reliability.

As illustrated in FIG. 10, the overlapping interval identification unit 320 may configure an interval from a content reproduction start position of the particular contents to a position (t1) where a preset content initial reproduction time elapses as an overlapping exclusion interval a.

Then, when an overlapping exclusion interval a is identified in reproduction time interval 1 of reproduction time interval information 1 among reproduction time intervals of each of a plurality of pieces of reproduction time interval information collected by the information collection unit 310, it is preferable that the overlapping interval identification unit 320 excludes overlapping exclusion interval a from reproduction time interval 1 and then identifies an overlapping interval between the reproduction time intervals.

The preferred interval determination unit 330 determines a preferred interval of the particular contents in each of overlapping intervals based on the number of overlaps of each overlapping interval identified by the overlapping interval identification unit 320.

That is, the preferred content interval determination unit 330 may determine an overlapping interval having the largest number of overlaps among respective overlapping intervals as a preferred interval of particular contents based on the number of overlaps of each of the identified overlapping intervals.

For example, referring to FIG. 10, the preferred interval determination unit 330 may determine overlapping interval b and overlapping interval c which have the largest number of overlaps corresponding to 3 among overlapping intervals as preferred intervals of particular contents like a first method.

Meanwhile, the preferred content interval service device 300 according to a third embodiment of the present disclosure may further include a reproduction time interval replacement unit 350.

When two or more pieces of reproduction time interval information generated as particular contents are reproduced in the one same UE are identified in a plurality of pieces of reproduction time interval information collected by the information collection unit 310, the reproduction time interval replacement unit 350 replaces reproduction time interval of the two or more pieces of identified reproduction time interval information with one reproduction time interval only when the reproduction time intervals of the two or more pieces of identified reproduction time interval information overlap each other.

For example, pieces of reproduction time interval information collected for particular contents may be collected from different UEs. Alternatively, as the one same UE reproduces particular contents several times, two or more pieces of reproduction time interval information collected from the one same UE may be included in the pieces of reproduction time interval information collected for the particular contents.

As described above, when the same particular contents are repeatedly reproduced in the one same UE, it highly likely reflects the personal taste of a particular user.

Accordingly, the reproduction time interval replacement unit 350 identifies whether two or more pieces of reproduction time interval information generated when the one same UE, for example, UE 1 reproduces particular contents exist in a plurality of pieces of reproduction time interval information collected by the information collection unit 310.

When it is identified that the two or more pieces of reproduction time interval information generated as the one same UE, that is, UE 1 reproduces the particular contents exists, the reproduction time interval replacement unit 350 may combine reproduction time intervals of the two or more pieces of identified reproduction time interval information and replace the reproduction time intervals with one reproduction time interval only when the reproduction time intervals of the two or more pieces of identified reproduction time interval information overlap each other.

For example, referring to FIG. 10, based on two pieces of reproduction time interval information generated as reproduction time interval 1 and reproduction time interval 4 of particular contents are reproduced in UE 1, the reproduction time interval replacement unit 350 may identify whether reproduction time intervals 1 and 4 overlap each other. When reproduction time intervals 1 and 4 overlap each other (overlapping interval b), the reproduction time interval replacement unit 350 may combine reproduction time intervals 1 and 4 and replace the reproduction time intervals 1 and 4 with one reproduction time interval 1'.

In this case, the overlapping interval identification unit 320 may identify overlapping intervals among reproduction time intervals 1', 2, and 3, and the preferred interval determination unit 330 may determine overlapping interval c having the largest number of overlaps corresponding to 3 among the overlapping intervals as preferred intervals of the particular contents like a second method illustrated in FIG. 10.

Meanwhile, the preferred content interval service device 300 according to the third embodiment of the present disclosure may further include a weight assignment unit 340.

When particular reproduction time interval information generated through a link with preview contents related to the particular contents is identified in a plurality of pieces of reproduction time interval information collected by the information collection unit 310, the weight assignment unit 340 may assign a preset overlapping number weight in connection with the number of overlaps to a reproduction time interval of the identified particular reproduction time interval information.

Recently, prior to the determination to reproduce contents, the user first reproduces/identifies preview contents pre-produced in connection with the contents and then reproduces actual contents when the user is interested in the contents in most cases. As described above, when the user first identifies preview contents and then reproduces contents, it may be considered that the user is very interested in the reproduction of the contents.

Then, the weight assignment unit 340 identifies whether particular reproduction time interval information generated through a link with preview contents related to particular contents exists in a plurality of pieces of reproduction time interval information collected by the information collection unit 310.

For example, referring to FIG. 10, reproduction time interval information 2 may be particular reproduction time interval information generated through a link with preview contents.

In this case, the weight assignment unit 340 may assign, to reproduction time interval 2 of reproduction time interval information 2, a preset overlapping number weight in connection with the number of overlaps.

For example, the weight assignment unit 340 may assign, to an overlapping interval in which reproduction time interval 2 overlaps, an overlapping number weight of allowing the overlapping interval identification unit 320 to multiply a particular weight (>1) and the number of overlaps or assign, to an overlapping interval in which reproduction time interval 2 overlaps, an overlapping number weight of allowing the overlapping interval identification unit 320 to add a particular weight (>0) and the number of overlaps.

Meanwhile, with respect to each of a plurality of pieces of reproduction time interval information collected by the information collection unit 310, when a volume control interval from a position where a volume up control is generated to a position where a volume down control is generated is identified in reproduction time intervals of reproduction time interval information, the weight assignment unit 340 may assign a preset overlapping number weight to the identified volume control interval in connection with the number of overlaps.

In general, while the user reproduces and enjoys contents, the user tends to turn up the volume in a part in which the user is interested and turn down the volume in a part in which the user is not interested.

Accordingly, with respect to each of a plurality of pieces of reproduction time interval information collected by the information collection unit 310, the weight assignment unit 340 identifies a volume control interval from a position where a volume up control is generated to a position where a volume down control is generated in reproduction time intervals of reproduction time interval information.

For example, referring to a third method illustrated in FIG. 10, volume control interval e from a position (e1) where a volume up control is generated to a position (e2) where a volume down control is generated may be identified in reproduction time interval 2 of reproduction time interval information 2.

In this case, the weight assignment unit 340 may assign a preset overlapping number weight to reproduction time interval 2 of reproduction time interval information 2 in connection with the number of overlaps.

For example, the weight assignment unit 340 may assign, to an overlapping interval in which reproduction time interval e overlaps, an overlapping number weight of allowing the overlapping interval identification unit 320 to multiply a particular weight (>1) and the number of overlaps, or may assign, to an overlapping interval in which reproduction time interval e overlaps, an overlapping number weight of allowing the overlapping interval identification unit 320 to add a particular weight (>0) and the number of overlaps.

Then, the preferred content interval determination unit 330 may determine an overlapping interval having the largest number of overlaps among respective overlapping intervals as a preferred interval of particular contents based on the number of overlaps of each of the overlapping intervals identified with the overlapping number weight.

In this case, the preferred interval determination unit 330 may determine overlapping interval c as the preferred interval or determine another overlapping interval, for example, overlapping interval d as the preferred interval according to how large value is configured/assigned as the overlapping number weight.

Further, the preferred content interval service device 300 according to the third embodiment of the present disclosure may further include a preferred interval provider 360.

The preferred interval provider 360 may extract and provide a preferred interval of particular contents determined by the preferred interval determination unit 330 according to a preferred interval reproduction request for particular contents.

That is, when the preferred interval reproduction request for particular contents is received from an unspecified UE, for example, UE1, the preferred content interval service device 360 may extract the preferred interval of the particular contents determined by the preferred interval determination unit 330 from the particular contents and provide the extracted preferred interval to UE 1.

As described above, according to the preferred content interval service device and the preferred content interval service system including the preferred content interval service device according to the third embodiment of the present disclosure, reproduction time intervals according to the reproduction of particular contents by an unspecified large number of users are collected and an interval having the largest number of overlaps among the collected reproduction time interval is determined as a preferred interval of the particular contents. In a process of determining the preferred interval, a beginning interval of generally reproduced contents, iterative reproduction by the same user, a volume control interval, and a link with preview contents are considered, so that a highly reliable preferred interval can be determined.

Figure 8:
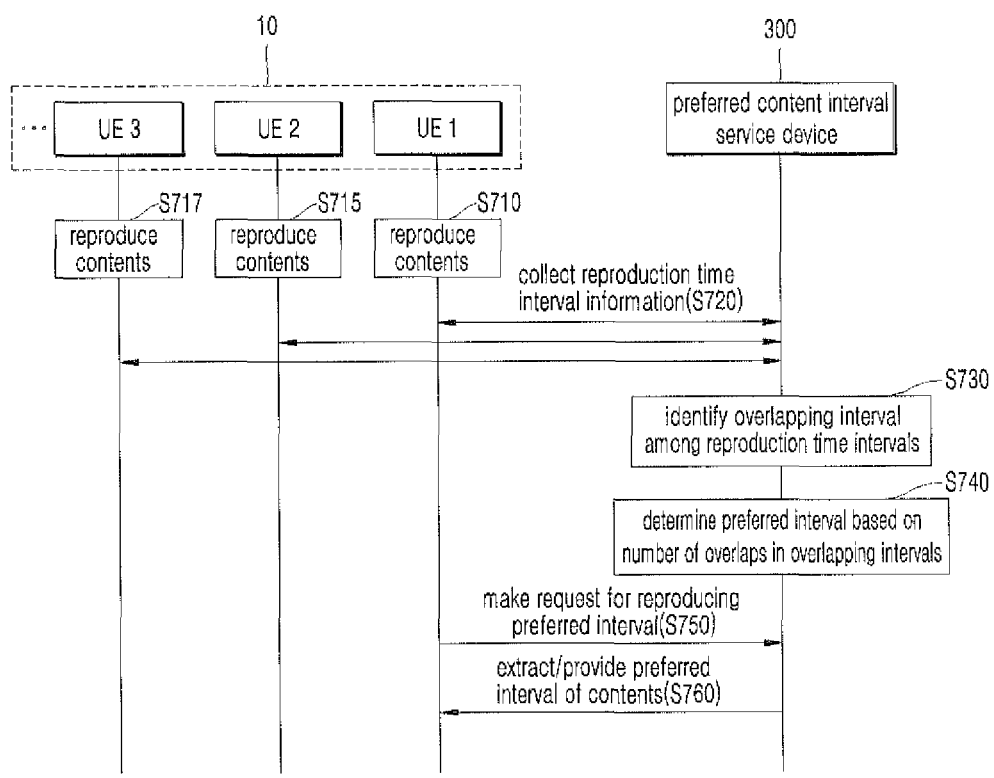
FIG. 8 is an operation flow diagram illustrating a preferred content interval service method according to the third embodiment of the present disclosure.
Figure 9:
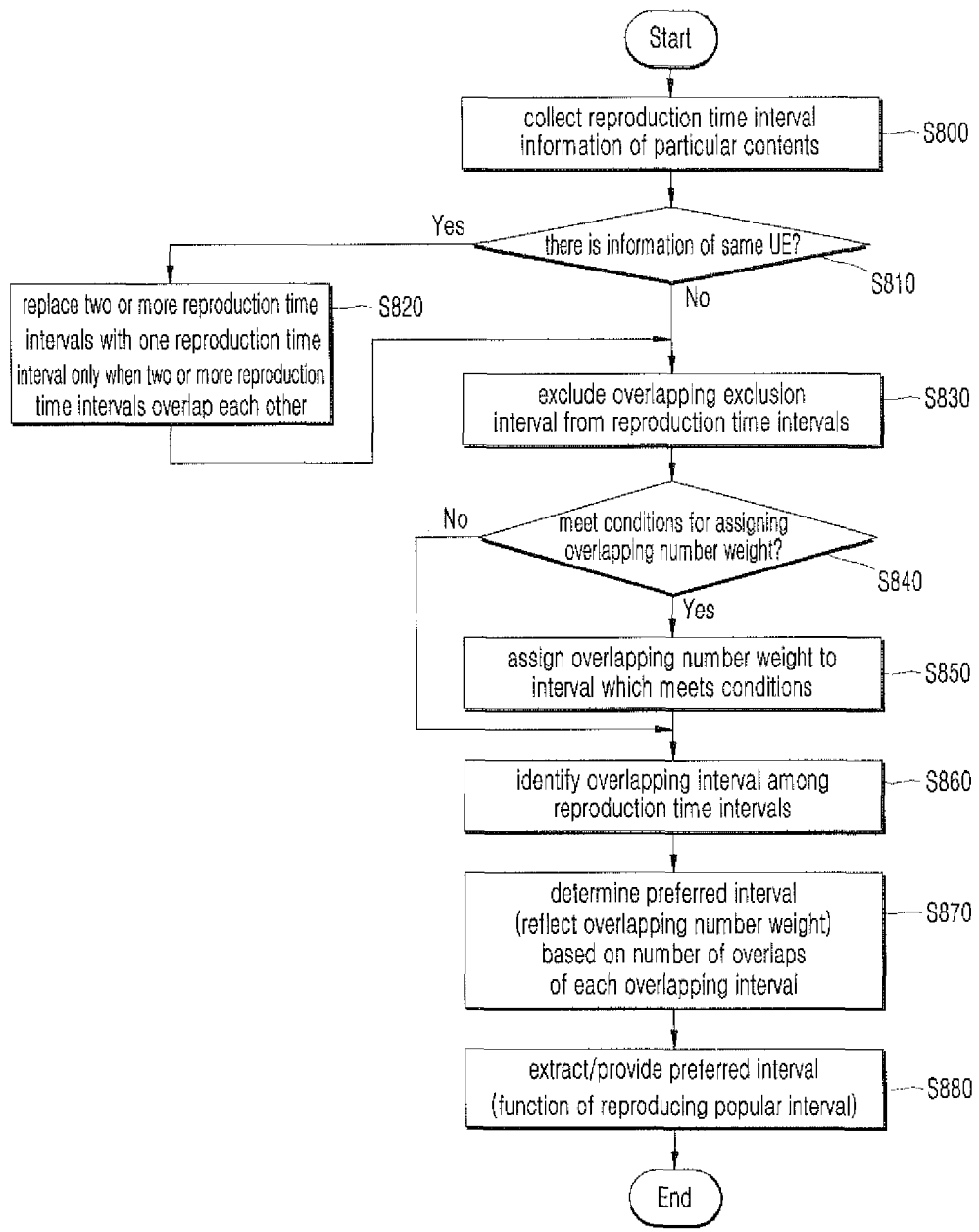
FIG. 9 is an operation flow diagram illustrating an operation method of the preferred content interval service device according to the third embodiment of the present disclosure.

Hereinafter, operation methods of a preferred content interval service method and a preferred content interval service device according to the third embodiment of the present disclosure will be described with reference to FIGS. 8 to 9.

First, the preferred content interval service method according to the third embodiment of the present disclosure will be described with reference to FIG. 8.

At least some reproduction time intervals of particular contents may be reproduced in an unspecified UE. For example, for the convenience of descriptions, a case where at least some reproduction time intervals of the same particular contents are reproduced in UEs 1, 2, and 3 of one or more UEs 100 will be described in steps S710, S715, and S717.

At this time, a date, a time and the like at which at least some reproduction time intervals of particular contents are reproduced in UEs 1, 2, and 3 are not limited.

As at least some reproduction time intervals of particular contents are reproduced in unspecified UEs, for example, UEs 1, 2, and 3, the preferred content interval service device 300 may collect reproduction time interval information related to the reproduction time intervals in step S720.

Further, the preferred content interval service device 300 identifies overlapping intervals among respective reproduction time intervals based on a plurality of pieces of collected reproduction time interval information in step S730.

Then, the preferred content interval service device 300 may determine an overlapping interval having the largest number of overlaps among respective overlapping intervals as a preferred interval of particular contents based on the number of overlaps of each of the identified overlapping intervals in step S740.

Further, when a preferred interval reproduction request for particular contents is received from an unspecified UE, for example, UE1 in step S750, the preferred content interval service device 300 may extract the determined preferred interval of the particular contents from the particular contents and provide the extracted preferred interval in step S760.

Hereinafter, an operation method of the preferred content interval service device according to the third embodiment of the present disclosure will be described with reference to FIG. 9.

In the operation method of the preferred content interval service device according to the third embodiment of the present disclosure, as at least some reproduction time intervals of particular contents are reproduced in unspecified UEs, for example, UEs 1, 2, and 3, reproduction time interval information related to the reproduction time intervals may be collected in step S800.

For example, a case where entire reproduction time intervals of particular contents are T (for example, 60 minutes) is described with reference to FIG. 10. In the operation method of the preferred content interval service device according to the third embodiment of the present disclosure, four pieces of reproduction time interval information 1, 2, 3, and 4 of particular contents may be collected and reproduction time intervals 1, 2, 3, and 4 may be included in each of the four pieces of reproduction time interval information as illustrated in FIG. 10.

In the operation method of the preferred content interval service device according to the third embodiment of the present disclosure, it is identified whether two or more pieces of reproduction time interval information generated as particular contents are reproduced in the one same UE, for example, UE 1 in a plurality of pieces of collected reproduction time interval information in step S810.

When it is identified that the two or more pieces of reproduction time interval information generated as the one same UE, that is, UE 1 reproduces the particular contents exists, reproduction time intervals of the two or more pieces of identified reproduction time interval information may be combined and replaced with one reproduction time interval only when the reproduction time intervals of the two or more pieces of identified reproduction time interval information overlap each other in step S820.

For example, referring to FIG. 10, based on two pieces of reproduction time interval information generated as reproduction time interval 1 and reproduction time interval 4 of particular contents are reproduced in UE 1, it is identified whether reproduction time intervals 1 and 4 overlap each other. When reproduction time intervals 1 and 4 overlap each other (overlapping interval b), reproduction time intervals 1 and 4 are combined and replaced with one reproduction time interval 1'.

Further, with respect to each of a plurality of pieces of collected reproduction time interval information, a particular overlapping exclusion interval is excluded from reproduction time intervals of the reproduction time interval information in step S830.

For example, as illustrated in FIG. 10, an interval from a content reproduction start position of the particular contents to a position (t1) where a preset content initial reproduction time elapses is configured as an overlapping exclusion interval a.

Accordingly, when overlapping exclusion interval a is identified in reproduction time interval 1 of reproduction time interval information 1 with respect to each of the reproduction time intervals of the plurality of pieces of collected reproduction time interval information, it is preferable that overlapping exclusion interval a is excluded from reproduction time interval 1.

Thereafter, reproduction time interval information which meets conditions for assigning an overlapping number weight is identified in a plurality of pieces of reproduction time interval information in step S840.

More specifically, as it is identified whether particular reproduction time interval information generated through a link with view contents related to particular contents exists in a plurality of pieces of reproduction time interval information, reproduction time interval information which meets conditions for assigning an overlapping number weight may be identified in step S840.

For example, referring to FIG. 10, reproduction time interval information 2 may be particular reproduction time interval information generated through a link with preview contents.

In this case, a preset overlapping number weight in connection with the number of overlaps may be assigned to reproduction time interval 2 of reproduction time interval information 2 in step S850.

For example, an overlapping number weight for multiplying a particular weight (>1) and the number of overlaps may be assigned to an overlapping interval in which reproduction time interval 2 overlaps, or an overlapping number weight for adding a particular weight (>0) and the number of overlaps to an overlapping interval in which reproduction time interval 2 overlaps.

Meanwhile, in the operation method of the preferred content interval service device according to the third embodiment of the present disclosure, with respect to each of a plurality of pieces of reproduction time interval information, a volume control interval from a position where a volume up control is generated to a position where a volume down control is generated is identified in reproduction time intervals of reproduction time interval information, and thus reproduction time interval information which meets conditions for assigning the overlapping interval weight can be identified in step S840.

For example, referring to a third method illustrated in FIG. 10, volume control interval e from a position (e1) where a volume up control is generated to a position (e2) where a volume down control is generated may be identified in reproduction time interval 2 of reproduction time interval information 2.

In this case, a preset overlapping number weight may be assigned to volume control interval e in connection with the number of overlaps in step S850.

For example, an overlapping number weight for multiplying a particular weight (>1) and the number of overlaps may be assigned to an overlapping interval in which volume control interval e overlaps, or an overlapping number weight for adding a particular weight (>0) and the number of overlaps to an overlapping interval in which volume control interval e overlaps.

In an operation method of the preferred content interval service device according to the third embodiment of the present disclosure, an overlapping interval between reproduction time intervals is identified based on a plurality of pieces of reproduction time interval information in step S860.

Further, an overlapping interval having the largest number of overlaps among respective overlapping intervals may be determined as a preferred interval of particular contents based on the number of overlaps of each of the overlapping intervals identified with the overlapping number weight in step S870.

In addition, according to a preferred interval reproduction request for particular contents, the preferred interval of the particular contents determined in step S870 may be extracted and provided in step S880.

That is, when the preferred interval reproduction request for the particular contents is received from an unspecified UE, for example, UE1, the determined preferred interval of the particular contents may be extracted from the particular contents and the extracted preferred interval may be provided to UE 1.

As described above, according to the preferred content interval service method according to the third embodiment of the present disclosure, reproduction time intervals according to the reproduction of particular contents by an unspecified large number of users are collected and an interval having the largest number of overlaps among the collected reproduction time interval is determined as a preferred interval of the particular contents. In a process of determining the preferred interval, a beginning interval of generally reproduced contents, iterative reproduction by the same user, a volume control interval, and a link with preview contents are considered, so that a high reliable preferred interval can be determined.

The method and algorithm that have been described in relation to the above first to third embodiments of the present invention may be implemented in the form of program instructions and recorded in a computer-readable medium. The computer readable medium may include a program command, a data file, a data structure, and the like independently or in combination. The program command recorded in the medium may be things specially designed and configured for the present invention, or things that are well known to and can be used by those skilled in the computer software related art. An example of the computer-readable recording medium includes magnetic media such as a hard disc, a floppy disc and a magnetic tape, optical media such as a CD-ROM and a DVD, magneto-optical media such as a floptical disc, and a hardware device, such as a ROM, a RAM, a flash memory, which is specially designed to store and perform the program instruction. Examples of the program command include a machine language code generated by a compiler and a high-level language code executable by a computer through an interpreter and the like. The hardware devices may be configured to operate as one or more software modules to perform the operations of the present invention, and vice versa.

Although the present disclosure has been described in detail with reference to exemplary embodiments, the present disclosure is not limited thereto and it is apparent to those skilled in the art that various modifications and changes can be made thereto without departing from the scope of the present disclosure.

INDUSTRIAL APPLICABILITY

According to a content providing service system, a method thereof, and an apparatus applied to the same according to a first embodiment of the present disclosure, the present disclosure is highly applicable to the industries since, as the present disclosure passes the limit of the conventional technologies, related technologies of the present disclosure can be used and also the device to which the present disclosure is applied has a high probability of entering into the market and being sold, and thus the present disclosure can be obviously implemented in reality in that transmission resources are first allocated to UEs which request real time contents, and at least some UEs are selected from the UEs which request reserved contents based on available capacity of the remaining transmission resources and the remaining transmission resources are allocated to the selected UEs in response to real time content requests and reserved content requests which are received at the same time.

Further, according to a content providing service system, a method thereof, and an apparatus applied to the same according to a second embodiment of the present disclosure, the present disclosure is highly applicable to the industries since, as the present disclosure passes the limit of the conventional technologies, related technologies of the present disclosure can be used and also the device to which the present disclosure is applied has a high probability of entering into the market and being sold, and thus the present disclosure can be obviously implemented in reality in that transmission resources are first allocated to guarantee a transmission rate required by UEs which request real time content and the remaining transmission resources are efficiently allocated to guarantee a transmission rate required by UEs which request real time contents in response to real time content requests and reserved content requests which are received at the same time.

In addition, according to a preferred content interval service system and method according to a third embodiment of the present disclosure, the present disclosure is highly applicable to the industries since, as the present disclosure passes the limit of the conventional technologies, related technologies of the present disclosure can be used and also the device to which the present disclosure is applied has a high probability of entering into the market and being sold, and thus the present disclosure can be obviously implemented in reality in that reproduction time intervals are collected as an unspecified large number of users reproduce particular contents and an interval having the largest number of overlaps among the collected reproduction time intervals is determined as a preferred interval of the particular contents, and therefore the reliability of a process of determining the preferred interval can be effectively improved.

What is claimed is:

1. A service device comprising:
a request receiver configured to receive a real time content request required to be received in real time or a reserved content request reserved in advance from each of a plurality of User Equipments (UEs) at a particular time;
a resource allocation unit configured to allocate transmission resources for transmitting the real time contents or the reserved contents to at least one UE which requests the real time contents and at least one UE which requests the reserved contents and;
an allocation controller configured to control the resource allocation unit to first allocate transmission resources to at least one UE which requests the real time contents and allocate the remaining transmission resources except for the first allocated transmission resources to at least one UE which requests the reserved contents
wherein, based on available capacity of the remaining transmission resources, when content capacity of all of the reserved contents requested at the particular time exceeds the available capacity of the remaining transmission resources, the allocation controller selects some of the UEs which request the reserved contents as targets to receive resources and allocates the remaining transmission resources to the selected UEs.

2. The service device of claim 1, wherein the allocation controller first selects UEs which request reserved contents having small content capacities from the UEs which request the reserved contents as the targets to receive the resources.

3. The service device of claim 1, wherein, when the reserved contents are requested from a particular UE, the allocation controller allocates transmission resources for transmitting contents which are equal to the requested reserved contents from the particular UE but have smaller content capacities than content capacities of the requested reserved contents.

4. The service device of claim 1, wherein the allocation controller allows the remaining UEs except for the UEs selected as the targets to receive the resources from the UEs which request the reserved contents to re-request the reserved contents and selects the UEs which re-request the reserved contents as the targets to receive the resources.

5. A service device comprising:
a request receiver configured to receive a real time content request required to be received in real time or a reserved content request reserved in advance from each of a plurality of User Equipments (UEs) at a particular time;
a resource allocation unit configured to allocate transmission resources for transmitting the real time contents or the reserved contents to at least one UE which requests the real time contents and at least one UE which requests the reserved contents; and
an allocation controller configured to control the resource allocation unit to first allocate transmission resources to at least one UE which requests the real time contents and allocate the remaining transmission resources except for the first allocated transmission resources to at least one UE which requests the reserved contents
wherein the allocation controller first allocates transmission resources to guarantee a transmission rate required by the UEs which request the real time contents and allocates the remaining transmission resources to guarantee a transmission rate required by at least some of the UEs which request the reserved contents.

6. The service device of claim 5, wherein, based on a maximum transmission rate which can be guaranteed by the remaining transmission resources, when a minimum transmission rate for transmitting all of the reserved contents requested at the particular time exceeds the maximum transmission rate which can be guaranteed by the remaining transmission resources, the allocation controller selects some of the UEs which request the reserved contents as targets to receive resources and allocates the remaining transmission resources to the selected UEs.

7. The service device of claim 6, wherein, in order to allocate transmission resources to as many UEs as possible within the limit of the minimum transmission rate not exceeding the maximum transmission rate which can be guaranteed by the remaining transmission resources, the allocation controller selects UEs which request reserved contents having small content capacities or UEs which request reserved contents through an access network requiring a minimum transmission rate as the targets to receive the resources from the UEs which request the reserved contents.

8. The service device of claim 5, wherein the allocation controller allows the remaining UEs except for the UEs selected as the targets to receive the resources from the UEs which request the reserved contents to re-request the reserved contents and selects the UEs which re-request the reserved contents as the targets to receive the resources.

9. A method of providing contents by a service device, the method comprising:
receiving a real time content request required to be received in real time or a reserved content request reserved in advance from each of a plurality of User Equipments (UEs) at a particular time;
first allocating transmission resources to at least one UE which requests the real time contents; and
additionally allocating the remaining transmission resources except for the first allocation transmission resources to at least one UE which requests the reserved contents
wherein, based on available capacity of the remaining transmission resources, when content capacities of all of the reserved contents requested at the particular time exceed the available capacity of the remaining transmission resources, the additionally allocating of the remaining transmission resources comprises selecting some of the UEs which request the reserved contents as the targets to receive the resources and allocates the remaining resources to the selected UEs.

10. The method of claim 9, wherein the additionally allocating of the remaining transmission resources comprises first selecting UEs which request reserved contents having small content capacities from the UEs which request the reserved contents as the targets to receive the resources.

11. The method of claim 9, wherein, when the reserved contents are requested from a particular UE, the additionally allocating of the remaining transmission resources comprises allocating transmission resources for contents which are equal to the requested reserved contents but have smaller content capacities than content capacities of the requested reserved contents.

12. The method of claim 9, further comprising inducing the remaining UEs except for the UEs selected as the targets to receive the resources from the UEs which request the reserved contents to re-request the reserved contents, wherein the additionally allocating of the remaining transmission resources comprises selecting the UEs which re-request the reserved contents as the targets to receive the resources.

13. A method of providing contents by a service device, the method comprising:
receiving a real time content request required to be received in real time or a reserved content request reserved in advance from each of a plurality of User Equipments (UEs) at a particular time;
first allocating transmission resources to at least one UE which requests the real time contents; and
additionally allocating the remaining transmission resources except for the first allocation transmission resources to at least one UE which requests the reserved contents
wherein the first allocating of the transmission resources comprises first allocating transmission resources to guarantee a transmission rate required by the UEs which request the real time contents, and the additionally allocating of the remaining transmission resources comprises allocating the remaining transmission resources to guarantee a transmission rate required by at least some of the UEs which request the reserved contents.

14. The method of claim 13, wherein, based on a maximum transmission rate which can be guaranteed by the remaining transmission resources, when a minimum transmission rate for transmitting all of the reserved contents requested at the particular time exceeds the maximum transmission rate which can be guaranteed by the remaining transmission resources, the additionally allocating of the remaining transmission resources comprises selecting some of the UEs which request the reserved contents as targets to receive resources and allocating the remaining transmission resources to the selected UEs.

15. The method of claim 14, wherein, in order to allocate transmission resources to as many UEs as possible within the limit of the minimum transmission rate not exceeding the maximum transmission rate which can be guaranteed by the remaining transmission resources, the additionally allocating of the remaining transmission resources comprises selecting UEs which request reserved contents having small content capacities or UEs which request reserved contents through an access network requiring a minimum transmission rate as the targets to receive the resources from the UEs which request the reserved contents.

16. The method of claim 13, further comprising inducing the remaining UEs except for the UEs selected as the targets to receive the resources from the UEs which request the reserved contents to re-request the reserved contents, wherein the additionally allocating of the remaining transmission resources comprises selecting the UEs which re-request the reserved contents as the targets to receive the resources.

* * * * *